United States Patent [19]

Viola

[11] Patent Number: 4,811,171

[45] Date of Patent: Mar. 7, 1989

[54] SUBMERSIBLE TAIL LIGHTS FOR BOAT TRAILERS

[76] Inventor: Gerald Viola, 66 Rome St., Farmingdale, N.Y. 11735

[21] Appl. No.: 247,361

[22] Filed: Sep. 21, 1988

[51] Int. Cl.⁴ .............................................. F21V 7/04
[52] U.S. Cl. ....................................... 362/32; 362/61; 362/80; 340/431; 340/815.31
[58] Field of Search ............................. 362/32, 61, 80; 280/414.1; 340/84, 87, 98, 686, 687, 815.31; 116/28 R

[56] References Cited

U.S. PATENT DOCUMENTS

| 2,338,748 | 1/1944 | Watkiss | 362/32 |
|---|---|---|---|
| 3,441,957 | 4/1969 | Friedman | 362/32 |
| 3,761,706 | 9/1973 | Frey | 362/32 |
| 3,887,093 | 6/1975 | Howell | 362/61 |
| 4,389,698 | 6/1983 | Cibie | 362/61 |
| 4,613,927 | 9/1986 | Brandt | 362/32 |
| 4,642,737 | 2/1987 | Meyers, Jr. | 362/32 |

Primary Examiner—Ira S. Lazarus
Assistant Examiner—Richard R. Cole
Attorney, Agent, or Firm—Hopgood, Calimafde, Kalil, Blaustein & Judlowe

[57] ABSTRACT

A lighting system is disclsoed for providing side and/or rear end lighting for a boat trailer characterized by a forward end portion for coupling to a vehicle and a rearwardly-extending cradle portion for supporting a boat, the cradle portion having sides and a rear end. The lighting system is comprised of a housing containing a light source mounted upon the forward end portion of said trailer; and at least one transparent light-transmitting plastic rod disposed at one end in light-transmitting relationship with the light source and extending rearwardly therefrom along the cradle portion to one or more positions thereof to provide lighting at one or more positions of the trailer.

15 Claims, 3 Drawing Sheets

SUBMERSIBLE TAIL LIGHTS FOR BOAT TRAILERS

This invention relates to a lighting system for a boat trailer or similar vehicle wherein light generated at a forward portion of said trailer or vehicle is transmitted by light-transmitting plastic rod or rods rearwardly of said forward portion, such as to the tail light section, or other section of said trailer or vehicle.

PROBLEM CONFRONTING THE ART

Boat trailers are generally used to transport a boat to a body of water, the boat trailer being usually towed by a motored vehicle, such as an automobile. Tail lights are mounted at the rear end of the trailer similar to the tail lights of an automobile and function generally in the same way to provide rear end or side lighting and provide the usual signals for making left and right turns, to indicate braking, provide flashes, etc., among other types of signals.

A problem with tail lights for boat trailers is their relatively short life. In backing a trailer to the waters edge and partially into the body of water via a vamp, the tail lights generally become submerged and the hot bulbs in the tail light housing tend to crack or explode when contacted by the cool water that leaks into the tail light housing.

In a recent publication, it is disclosed that blinked-out bulbs have long been the bane of boat trailers, and equipment manufacturers have put a great deal of energy into creating water-proof housings for trailer tail lights. The publication further states that because of road hazards and the generally hard use that trailers undergo, most products eventually fail and boat owners find themselves replacing bulbs often. Water entering the tail light housings can also short out bulbs, and where the water is salty, corrosion can rot away the light assembly. Such conditions, when they occur, can create a very dangerous driving situation, particularly at night.

STATE OF THE ART

It is known to employ fiber optics as a fishing lure. One method of such use is disclosed in U.S. Pat. No. 4,727,674 in which a battery operated lure is described. Light is transmitted through strands of fiber optics. The patent states that different angles of light transmitted through optical fibers tend to attract different species of fish. However, this concept is not relevant to the invention disclosed and claimed herein.

OBJECTS OF THE INVENTION

It is an object of the invention to provide a lighting system to provide side and/or rear end lighting for a boat trailer that is not adversely affected when the light element is submerged in and is contacted by cold water.

Another object is to provide a lighting system for a boat trailer, wherein a light source at forward end portion of the trailer is transmitted rearwardly thereof by means of transparent light-transmitting plastic rod or rods extending from said light source and terminating at a rear portion of said trailer.

These and other objects will more clearly appear from the following disclosure, the appended claims and the accompanying drawings.

SUMMARY OF THE INVENTION

In its broad aspect, the invention is directed to a lighting system for providing side and/or rear end lighting for a boat trailer characterized by a forward end portion for coupling to a vehicle and a rearwardly-extending cradle portion for supporting a boat. The cradle portion has sides and a rear end, the forward end portion of the trailer having mounted thereon a housing containing a light source. The housing is supported sufficiently high to avoid being inundated by water, when the trailer is backed into the water during boat launching from a ramp.

Figure 8:
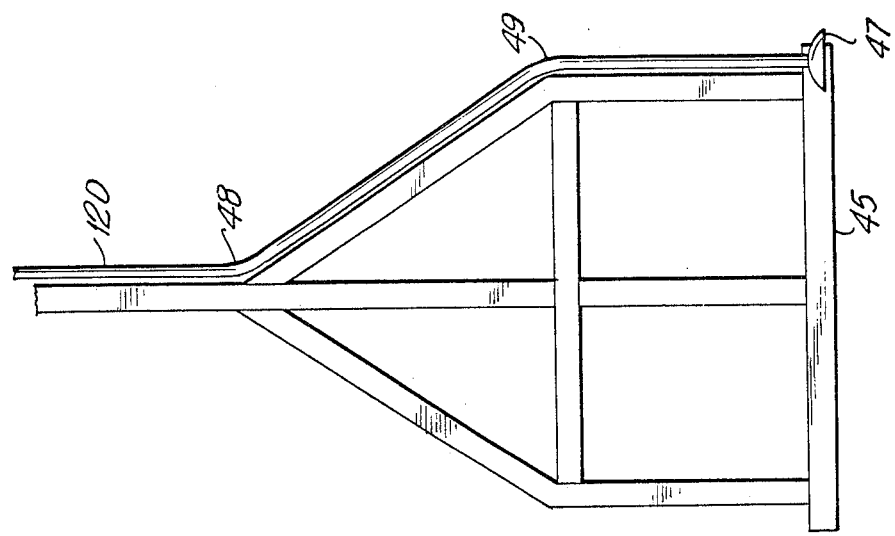
FIGS. 6, 7 and 8 are schematic renditions of the boat trailer in plan view showing various ways by means of which light is transmitted from the forward end of the trailer to the rear end thereof.
Figure 7:
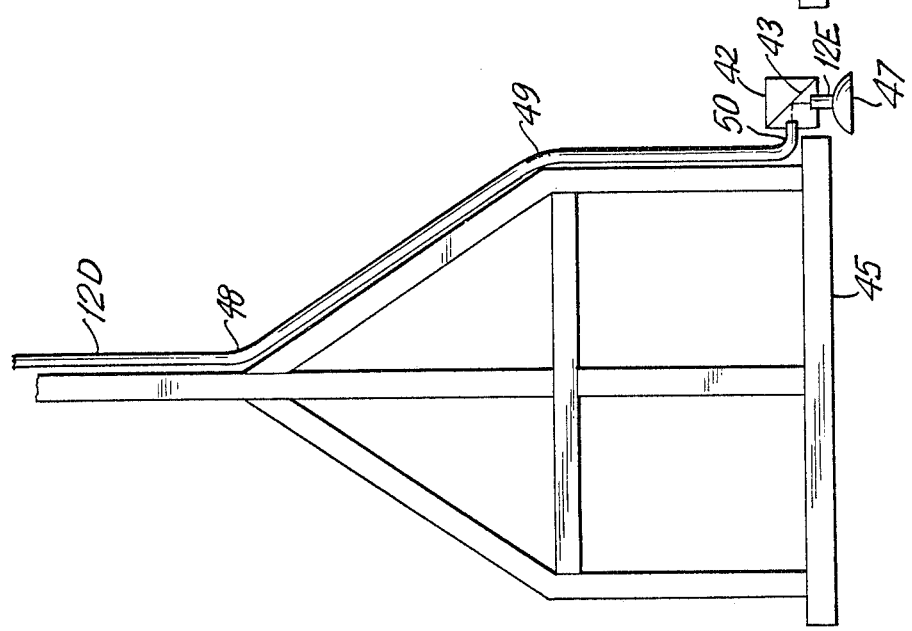
Figure 6:
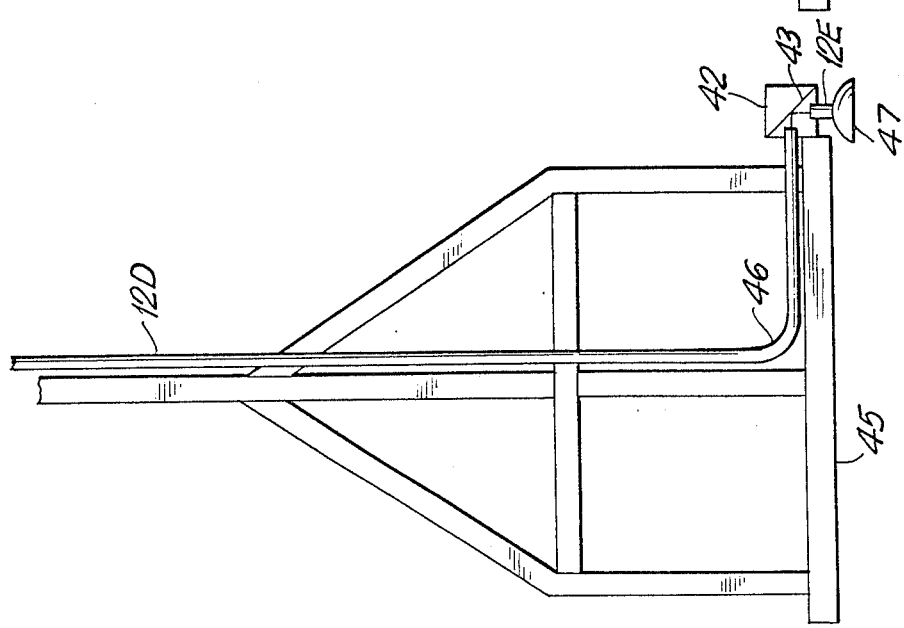

At least one transparent light-transmitting plastic rod of high optical quality, preferably a pair, is provided with one end thereof cooperatively associated with the light source in light-transmitting relationship therewith and extending rearwardly therefrom along said cradle portion to one or more positions thereof to provide transmitted light at said one or more positions (note FIGS. 6 to 8). The invention is particularly useful in providing indirect lighting to the tail light section at the rear end of said boat trailer.

The light-transmitting rod is preferably made of acrylic plastic although other clear plastics of high optical quality can be used. In a preferred embodiment, a pair of rods, or a rod assembly (e.g., a bundle of rods) is employed, wherein the light-transmitting rod, or bundle thereof, extends from the light source along one or more sides of the cradle portion and terminates at the rear end of said cradle portion in a tail light housing to provide at least a pair of spaced-apart tail lights.

The forward end of the boat trailer may comprise a single rail for attachment to a vehicle, the single rail extending rearwardly with two rails bifurcating therefrom to form with cross rails and extending side rails the cradle portion of the trailer for supporting the boat.

Either cast or extruded rods for the plastic light transmitter, e.g., acrylic rods, may be employed, the cast rod being preferred. Typical acrylic rods include those referred to by the trademark of Lucite. An example of the acrylic material is polymethyl methacrylate.

The plastic rod can be formed or bent to conform to the shape of the boat trailer where required. When the rod is hot-formed into a 90° bend, it will have a radius depending on the size of the rod. The radius can be used on inside corners of 90° angles. In the case of sharp 90° angles, this can be achieved by having the rod enter one side of a small box that has confined in it a mirror disposed at a 45° angle to the axis of incoming rod. Another rod is coupled to the box at 90° to the incoming rod so that the light reflected by the mirror enters the second rod which extends to the rear of the trailer. Embodiments of this will be described later.

The lighting source is provided with means for connection to an electrical system of the vehicle used for transporting said boat trailer.

In a preferred embodiment, the housing for the light source may comprise at least two compartments separated by an opaque wall, each compartment containing an incandescent lamp which is connectible in the conventional manner to the electrical system of the vehicle or automobile towing the boat trailer. The housing is mounted on a post at the forward end of the trailer and is designed to be weatherproof. The post is sufficiently high so that the housing is not submerged when the trailer is backed into the water from a ramp for discharging the boat. The post may contain, if desired, an electrically driven winch (not shown) for pulling the boat out of the water on to the trailer.

DETAILS OF THE INVENTION

The details of the invention will be hereinafter discussed with reference to the drawings.

Figure 1:
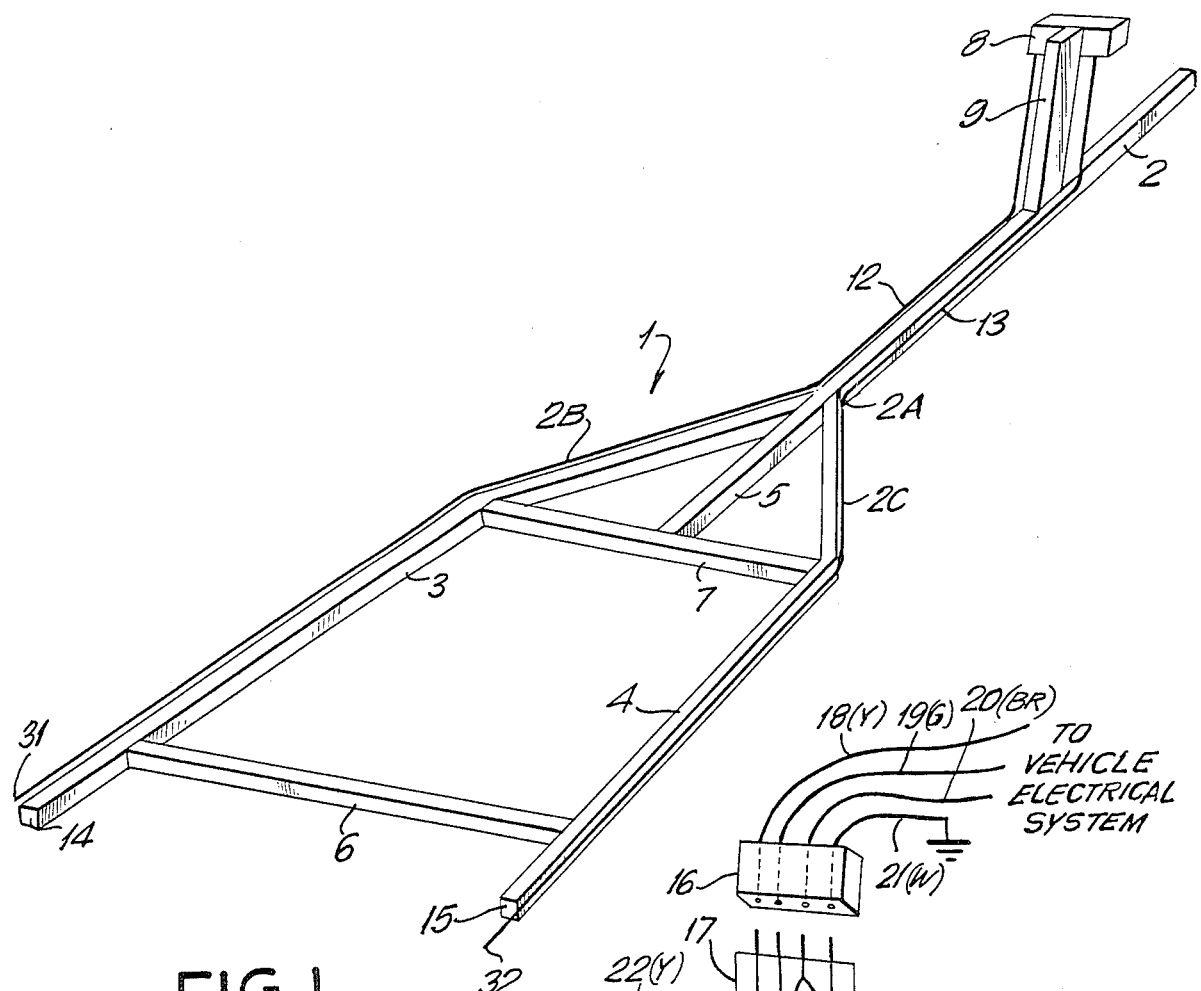
FIG. 1 is a perspective view of a boat trailer with the wheels supporting the trailer omitted.

Referring to FIG. 1, the main structure of the boat trailer 1 is shown with the supporting wheels omitted for clarity, the trailer comprising a forward end portion in the form of a center rail 2 for coupling to an automobile (coupling means not shown) which rail extends rearwardly and is connected at an intermediate region 2A of said rail 2 to two rails 2B and 2C which bifurcate therefrom as shown, rail 2 coextending as rail 5 and being connected to cross rail 7 which in turn is connected to rails 2B, 2C, respectively, and are parallel to each other and are connected to cross rail 6 near the end of said trailer. The rails 2B, 2C, 3, 4, 5 and cross rails 6 and 7 provide the cradle portion upon which the main portion of the boat is supported.

The housing 8 for the light source is connected to rail 2 by an elevated post 9. As stated earlier, the post may contain an electrically driven winch (not shown) for pulling a boat out of the water onto the trailer 1.

Light generated in housing 8 by incandescent automotive lamps 10 and 11 is transmitted through transparent light-transmitting acrylic rods 12 and 13 which extend down post 9, and which are bent (by heat) to follow rail 2 at each side thereof, the rods then bifurcating, respectively, along rails 2B, 2C and continuing along rails 3 and 4 and terminate at rear ends 14 and 15 to provide light-transmitting ends 31 and 32 of rods 12 and 13, respectively, which provide lighting for the tail light housings.

Figure 2:
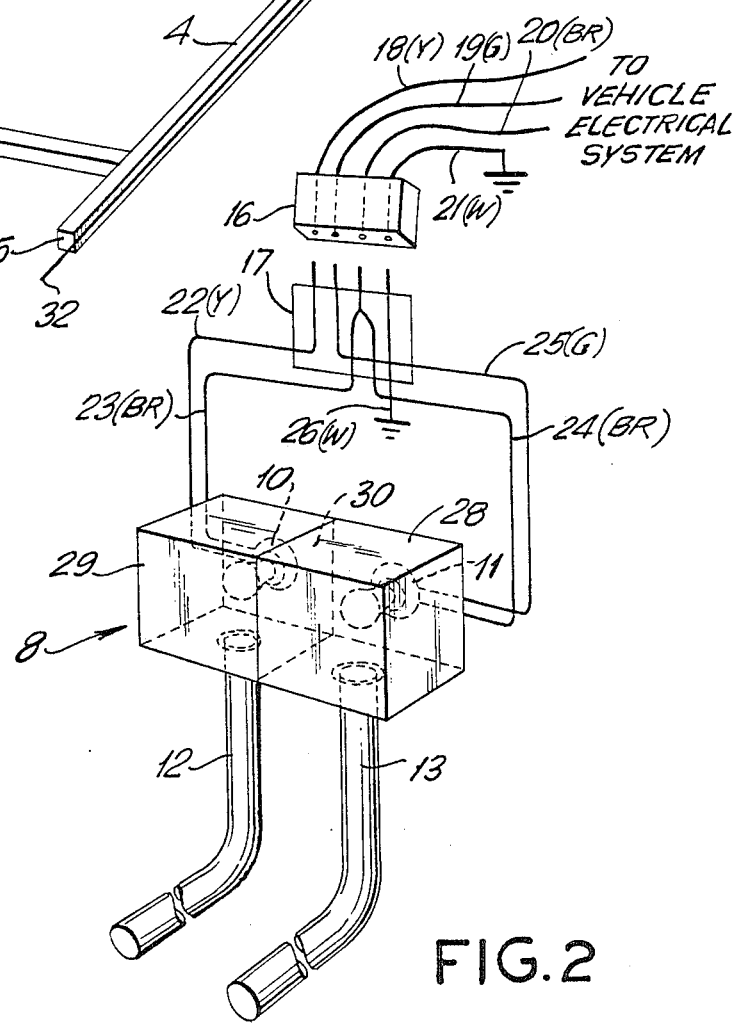
FIG. 2 depicts a partly schematic and a partially perspective view of the light source housing and wiring of one embodiment of the invention.

FIG. 2 is one embodiment of the lighting system showing box or housing 8 comprised of two compartments or chambers 28, 29 divided by an opaque wall 30 (i.e., opaque to light) and containing therein light sockets 10, 11 with incadescent automotive bulbs in the sockets. Communicating with the bottom wall of the light housing are light transmitting plastic rods (e.g., acrylic) 12, 13 which extend downwardly therefrom and extend to the rear of the trailer on the tail light housings.

The light housing or box 8 is electrically connected to a male plug body 17 as shown in FIG. 2, which in turn is matable with female plug 16 which is connected to the electrical system of the towing vehicle. The connecting wires are color coded in accordance with standard practice for motor vehicles so that the parts are correctly wired to assure proper operation of the tail lights.

The electrical wires from the towing vehicle are depicted by numerals 18 (yellow), 19 (green), 20 (brown), and 21 (white) for ground, these wires being connected to female plug 16.

The electrical wires connected via male plug 17 to the light housing or box 8 are 22 (yellow), 23 and 24 (brown), 25 (green) and 26 (white) for ground.

As stated earlier, color coding of the wires is standard practice in automobiles. The left turn signal is carried along the yellow wire, the right turn signal along the green wire and the running and brake lights are signaled via the brown wire. The white wire is for grounding.

The transparent light transmitting rod gives surprisingly good results when used in accordance with the invention in providing rear-end lighting for a boat trailer.

The diameter of the cast or extruded acrylic rod employed will depend upon the amount of light needed and also by the length of the trailer. For example, the diameter may range up to one inch or more.

Figure 5:
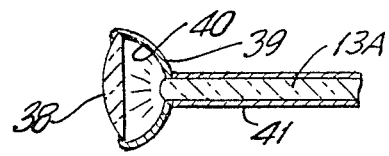
FIG. 5 is a cross section of a tail light assembly showing a lens covered housing and a portion of the light-transmitting plastic rod and through which light is transmitted and directed against the lens face constituting the tail light.

On the other hand, multiple rods can be bundled together to provide more flexibility in negotiating corners and to provide more light to the rear tail light housing shown in FIG. 5.

Figure 4:
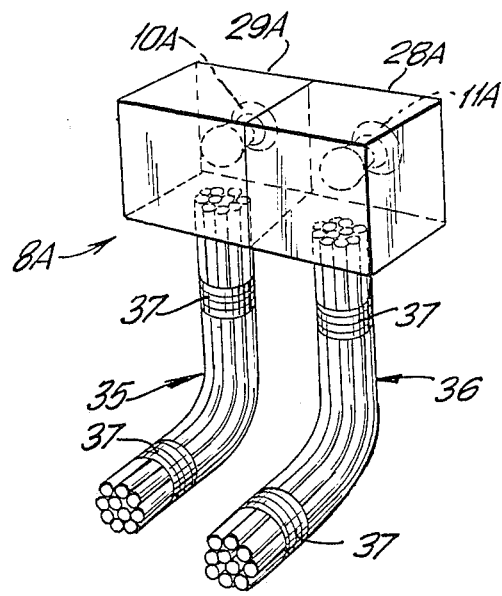
FIG. 4 shows as one embodiment the use of a bundle of rods in carrying out the objects of the invention.

The use of a bundle of rods is shown in FIG. 4. The bundles 35, 36 are held together by a plurality of bands 37, one end of the bundle being in light-transmitting relationship with light housing 8A, comprising compartments 28A, 29A containing light sockets 10A, 11A with incandescent automotive light bulbs therein as shown. The other end of each bundle extend rearwardly to the back end of the trailer to the tail light housings.

Figure 3:
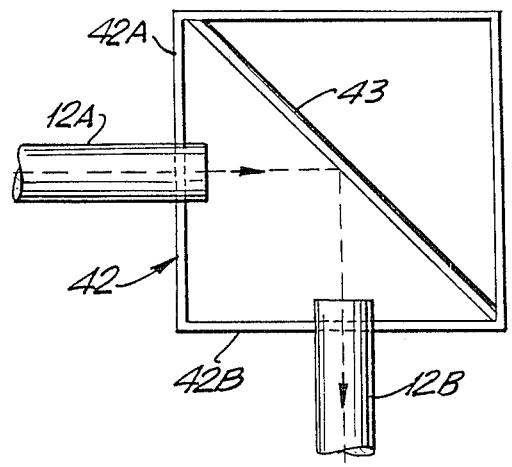
FIG. 3 illustrates an embodiment in which transmitted light can be caused to sharply change direction, i.e., make an immediate 90° turn, by employing a box having a mirror disposed at an angle 45° to the axis of an acrylic rod partially entering the box, and an acrylic rod leaving the box at an angle of 90° to the axis of the entering rod.

FIG. 3 shows rod 12A partially entering box 42 at side 42A which has a mirror 43 disposed at an angle of 45° to the axis of rod 12A. Coupled to the box at side 42B is rod 12B whose axis is also disposed at a 45° angle to the mirror. The light entering the box via rod 12A is sharply reflected at a 90° angle and enters rod 12B which continues along the trailer to the rear end portion thereof.

Figure 3A:
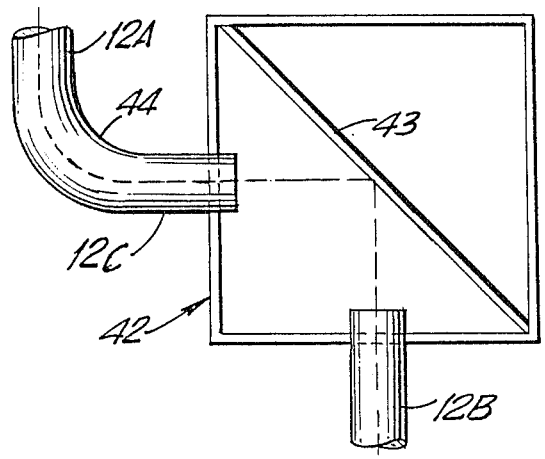
FIG. 3A is similar to FIG. 3 except that the acrylic rod entering the box negotiates a 90° turn before entering the box by virtue of a radius of curvature to provide a right angle which is hot formed into the rod.

FIG. 3A is a modification of FIG. 3 except that in this case rod 12A is bent at 90° to provide radius of curvature 44, the leg 12C entering the box as shown with its axis at a 45° angle to mirror 43 so that the light is reflected through rod 12B and out to the rear of the trailer. As will be noted, the light has changed direction twice.

The various ways in which the light can be conducted from the light source to the rear of the trailer is shown in FIGS. 6 to 8 which are schematics of the cradle portion of the trailer showing how the light can be conducted to one or more tail lights at the rear of the boat trailer. The rods follow the shape or configuration of the cradle.

Thus, in FIG. 6, the transparent light is conducted from a light source not shown (but illustrated in FIG. 2) via acrylic rod 12D along substantially the middle of the cradle to its rear end 45 where it is bent with a radius of curvature 46 to provide a 90° turn and enters box 42 provided with mirror 43 which reflects the light along acrylic rod 12E, which light then enters the housing of tail light 47 as shown.

Using the same numerals, FIG. 7 shows acrylic rod 12D or other light-conducting plastic following the side of the cradle and bending to conform to the side, a shallow bend occurring at 48 and 49 as shown with the rod extending to the rear end and curved at 50 to provide a 90° angle before entering reflecting box 42 with the mirror therein. The light is reflected through light-transmitting rod 12E into the housing of tail light 47.

The embodiment of FIG. 8 is similar to FIG. 7, the rod 12D having shallow bends 48 and 49, the rod then extending directly into tail light housing 47 as shown.

One embodiment of the tail light housing is shown in more detail in FIG. 5, comprising a glass lens 38 disposed as the face of housing 39 which has a reflecting inner surface 40. The transparent acrylic rod 13A, enclosed in a sheath 41 at the housing, extends sufficiently into the tail light housing to provide the required lighting for the tail light.

Figure 9:
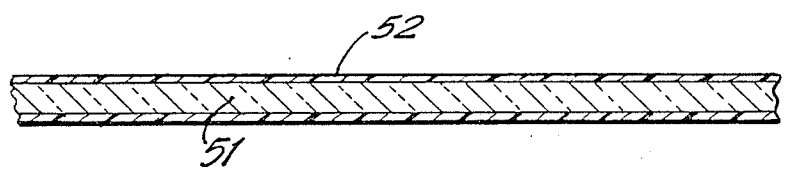
FIG. 9 is a cross section of an acrylic rod in which the outside surface of the rod is characterized by an opaque layer, sheath or coating to aid in the efficient transmission of light along the rod.

To aid in efficient light transmission, it may be desirable to apply an opaque coating, layer, or sheath over the light transmitting rod to minimize loss of light. FIG. 9 shows a cross section of a segment of a light-transmitting rod 51 with a layer 52 of black electrician's tape or other sheath or coating, for example, a vapor deposited nickel coating.

As will be clearly apparent, the entire system from the post 9 backward to the end of the trailer can be immersed in water for any length of time without any adverse effects. Whenever a bulb has to be replaced due to failure from ordinary use, the replacement can be done right at the light source box 8 which is mounted on the post 9 at the forward end of the trailer. Advantages of the present invention over lighting systems employed for trailers known in the prior art are that the present invention comprises a relatively long lasting, substantially foolproof lighting system, is more easily maintained than prior art systems, and eliminates the danger of driving a vehicle pulling a boat trailer which has an inoperative lighting system and hence no running light, turn signals, brake lights and hazard lights.

Although a preferred embodiment of the invention has been shown herein, numerous other embodiments within the scope of the appended claims will occur to those of ordinary skill in the art.

I claim:

1. A lighting system for providing side and/or rear-end lighting for a boat trailer characterized by a forward end portion for coupling to a vehicle and a rearwardly-extending cradle portion for supporting a boat, said cradle portion having sides and a rear end, which comprises:
   a housing containing a light source mounted upon said forward end portion of said trailer; and
   at least one transparent light-transmitting plastic rod disposed at one end in light-transmitting relationship with said light source and extending rearwardly therefrom along said cradle portion to one or more positions thereof to provide lighting at said one or more positions.

2. A lighting system as in claim 1, wherein at least two light-transmitting rods extend rearwardly along said cradle portion and terminate at the rear end of said cradle portion to provide at least a pair of spaced-apart tail lights.

3. The lighting system for a boat trailer as in claim 2, wherein the housing for the light source is comprised of at least two compartments separated by an opaque wall, each compartment containing an incandescent lamp and has cooperatively associated in light-transmitting relationship therewith an end portion of each of said light-transmitting rods which extend to the rear of said cradle portion and terminate into at least a pair of spaced-apart tail lights.

4. The lighting system as in claim 3, wherein the plastic rod is an acrylic rod selected from the group consisting of cast and extruded rods.

5. The lighting system as in claim 4, wherein the acrylic rod is polymethyl mathacrylate.

6. The lighting system as in claim 4, wherein the light transmission is achieved using a bundle of rods extending from each compartment of said light source.

7. The lighting system as in claim 3, including means for connecting the light-producing source to an electrical system of a vehicle used for transporting said boat trailer.

8. The lighting system as in claim 3, wherein the at least one light-transmitting rod extending longitudinally and rearwardly from the light source is bent in accordance with the shape or configuration of the boat trailer upon which the at least one rod is mounted.

9. A lighting system for providing side and/or rear-end lighting for a boat trailer characterized by a forward end portion for coupling to a vehicle and a rearwardly extending cradle portion for supporting a boat, said cradle portion having sides and a rear end, which comprises:
   a housing for a light source comprising at least two compartments separated by an opaque wall mounted upon said forward end portion of said trailer;
   each compartment of said housing having means for mounting a light source therein;
   and at least one transparent light-transmitting plastic rod consisting essentially of an acrylic rod selected from the group consisting of cast rods and extruded rods disposed at one end in light-transmitting relationship with said light source and extending rearwardly therefrom along said cradle portion to one or more positions thereof to provide lighting at said one or more positions.

10. The lighting system as in claim 9, wherein the acrylic rod is polymethyl methacrylate.

11. The lighting system as in claim 10, wherein the at least one light-transmitting rod extending longitudinally and rearwardly from the light source is bent in accordance with the shape or configuration of the boat trailer upon which the at least one rod is mounted.

12. The lighting system as in claim 9, wherein the light source is an incandescent automotive lamp disposed in each of said compartments, and wherein at least one of said acrylic rods extend rearwardly along said cradle and terminates into a pair of spaced-apart tail lights.

13. The lighting system as in claim 12 wherein the light transmission is achieved using a bundle of rods extending from each compartment of said light source.

14. The lighting system as in claim 12, including means for connecting the light-producing source to an electrical system of a vehicle used for transporting said boat trailer.

15. The lighting system as in claim 9, wherein the light transmitting rod has an opaque coating, layer or sheath on its surface.

* * * * *